(12) United States Patent
Le Mer

(10) Patent No.: US 12,480,724 B2
(45) Date of Patent: Nov. 25, 2025

(54) CONDENSATION HEAT EXCHANGER

(71) Applicant: Sermeta, Morlaix (FR)

(72) Inventor: Joseph Le Mer, Plouezoch (FR)

(73) Assignee: Sermeta (FR)

( * ) Notice: Subject to any disclaimer, the term of this patent is extended or adjusted under 35 U.S.C. 154(b) by 917 days.

(21) Appl. No.: 17/763,437

(22) PCT Filed: Sep. 25, 2020

(86) PCT No.: PCT/EP2020/076946
§ 371 (c)(1),
(2) Date: Mar. 24, 2022

(87) PCT Pub. No.: WO2021/058762
PCT Pub. Date: Apr. 1, 2021

(65) Prior Publication Data
US 2022/0341684 A1 Oct. 27, 2022

(30) Foreign Application Priority Data
Sep. 26, 2019 (FR) ...................................... 1910666

(51) Int. Cl.
*F28F 9/00* (2006.01)
*F16B 17/00* (2006.01)
(Continued)

(52) U.S. Cl.
CPC .............. *F28F 9/001* (2013.01); *F24H 9/02* (2013.01); *F24H 9/146* (2013.01); *F24H 9/148* (2013.01);
(Continued)

(58) Field of Classification Search
CPC .. F28F 9/001; F28F 9/002; F28F 9/013; F28F 9/22; F28F 2009/226; F24H 9/146;
(Continued)

(56) References Cited

U.S. PATENT DOCUMENTS

2006/0196450 A1 9/2006 Le Mer et al.
2018/0087806 A1 3/2018 Kondo et al.

FOREIGN PATENT DOCUMENTS

DE 112012000637 T5 * 1/2014 ............. F01M 5/002
FR 2850451 A1 7/2004
(Continued)

OTHER PUBLICATIONS

DE-112012000637-T5 translation (Year: 2014).*
(Continued)

*Primary Examiner* — Steven S Anderson, II
*Assistant Examiner* — Kurt Wolford
(74) *Attorney, Agent, or Firm* — Lerner David LLP

(57) ABSTRACT

A condensation heat exchanger including at least one helically-coiled tube, inside which a fluid to be heated can circulate, a deflector, and a shell mounted inside which the tube, the shell having a gas-discharge sleeve having a bottom and a facade for feeding and/or producing a hot gas, inside the shell. The shell comprises a tubular metallic shroud closed at its two ends by a facade and a bottom, wherein the bottom is made of composite plastic, the rear edge of the shroud has a plurality of fastening tongues, the bottom has, at its periphery, a plurality of fastening slots arranged along at least part of its circumference, each fastening slot bordered longitudinally by a first longitudinal rib projecting outwardly, and wherein each fastening tongue is inserted into a fastening slot and folded twice around the first rib.

14 Claims, 14 Drawing Sheets

(51) Int. Cl.
- *F24H 1/43* (2022.01)
- *F24H 9/02* (2006.01)
- *F24H 9/14* (2006.01)
- *F28D 7/02* (2006.01)
- *F28D 21/00* (2006.01)
- *F28F 9/013* (2006.01)
- *F28F 9/22* (2006.01)

(52) U.S. Cl.
CPC ......... *F28D 7/024* (2013.01); *F28D 21/0003* (2013.01); *F28F 9/002* (2013.01); *F28F 9/013* (2013.01); *F28F 9/22* (2013.01); *F16B 17/006* (2013.01); *F16B 17/008* (2013.01); *F24H 1/43* (2013.01); *F28D 21/0007* (2013.01); *F28D 2021/0024* (2013.01); *F28F 2009/226* (2013.01)

(58) Field of Classification Search
CPC . F24H 9/148; F24H 1/43; F28D 7/024; F28D 21/0003; F28D 21/0007; F28D 2021/0024; F16B 17/006; F16B 17/008
See application file for complete search history.

(56) References Cited

FOREIGN PATENT DOCUMENTS

| FR | 3072163 A1 | 4/2019 | |
|---|---|---|---|
| KR | 20130054253 A * | 5/2013 | |
| KR | 20140127535 A | 11/2014 | |
| WO | 2004036121 A1 | 4/2004 | |
| WO | WO-2007066369 A1 * | 6/2007 | ............... F24H 1/43 |
| WO | 2015140664 A1 | 9/2015 | |

OTHER PUBLICATIONS

KR-20130054253-A translation (Year: 2013).*
French Preliminary Search Report for Application No. 1910666 dated Apr. 3, 2020, pp. 1-2.
International Search Report for Application No. PCT/EP2020/076946 mailed Nov. 18, 2020, pp. 1-3.

* cited by examiner

CONDENSATION HEAT EXCHANGER

CROSS-REFERENCE TO RELATED APPLICATIONS

The present application is a national phase entry under 35 U.S.C. § 371 of International Application No. PCT/EP2020/076946 filed Sep. 25, 2020, which claims priority from French Application No. 1910666 filed Sep. 26, 2019, all of which are incorporated herein by reference.

FIELD OF THE INVENTION

The invention lies in the field of condensing heat exchangers.

The present invention more specifically relates to the structure of the casing of such exchangers.

STATE OF THE ART

In order to be able to put on the market condensing heat exchangers at a lower cost, it was necessary to review the overall structure of the existing exchangers and in particular to reduce the number of their parts, which allows reducing their manufacturing and assembly costs.

For example, it is known from document WO2004/036121 a condensing heat exchanger comprising at least one bundle of helically wound tubes made of a thermally conductive material and inside which water to be heated flows. This tube is itself disposed inside a casing and a burner is disposed axially inside said winding, so that the hot gases produced by the burner pass through the spaces between the adjacent turns and heat the water flowing in the tube.

The casing is made of heat-resistant plastic material.

However, in order to limit the spacing movement of the turns of the tube, in the axial direction, this movement resulting from the internal pressure of the water which flows in the tube, it is necessary to have a retaining plate at each end of the winding and axial mechanical restraint tie rods. This allows preventing the thrust forces resulting from this pressure from being transmitted to the casing.

In addition, the casing, made of plastic material, has the shape of two half-shells, assembled together by welding, screws or clips and a ferrule is disposed between the tube and the interior of the plastic casing, in order to ensure a heat shield function able to insulate the casing from the heat emitted by the flue gases.

Such a high-performance exchanger therefore comprises many parts, which makes it more expensive and takes longer to manufacture.

It is already known from document WO 2015/140664 a heat exchanger which comprises a casing, inside which a helically wound tube is mounted and inside which water can flow, a facade which supports a burner and a separation element supporting a disk of refractory material.

Before assembly, the casing comprises two half-shells, each half-shell comprising a one-piece semi-cylindrical portion with a semi-circular portion.

The assembly of the two half-shells is performed by welding along their three respective rectilinear sides.

This document neither describes nor suggests having a casing consisting, before assembly, of a tubular metal ferrule and of a bottom formed in a composite plastic material, nor the assembly of these two elements by cooperation of tabs and slots.

Consequently, the two half-shells must be made of a very thick material which must have both very good mechanical resistance and very good thermal resistance, in order to resist hot gases and ensure the compression of the tube. This heat exchanger therefore implements more expensive materials.

DISCLOSURE OF THE INVENTION

One aim of the invention is therefore to limit the total number of parts of a condensing heat exchanger, to simplify the assembly of these parts and finally to eliminate the axial stress tie rods, while proposing a reliable exchanger whose casing does not deform.

Another aim of the invention is to produce a heat exchanger that is less expensive than the heat exchangers known from the state of the art, while guaranteeing the axial stress function of the wound tube.

It was therefore necessary to completely redesign such a heat exchanger.

To this end, the invention relates to a condensing heat exchanger comprising:

at least one helically wound tube made of a thermally conductive material and inside which a fluid to be heated, such as water, can flow, a casing inside which said tube is mounted, this casing being provided with a gas discharge sleeve, a bottom and a facade, which supports means for delivering and/or producing a hot gas inside the casing, such as a gas or oil burner, a deflector which comprises a disk made of thermally insulating material, carried by a sheet metal reinforcement, said deflector being positioned relative to the helically wound tube so as to delimit, with said facade, a combustion chamber.

In accordance with the invention, said casing comprises a body consisting of a tubular metal ferrule, this tubular ferrule being closed at one of its two ends by said facade and at its other end by said bottom, said tubular ferrule and said bottom are separate before assembly, said bottom is formed in a composite plastic material, one of the two edges of the tubular ferrule, called "rear edge", has on at least part of its circumference, a plurality of cutouts delimiting fastening tabs, the bottom has at its periphery a plurality of fastening slots, disposed along at least part of its circumference, each fastening slot being dimensioned so as a fastening tab can be inserted therein, each fastening slot being bordered longitudinally by a first longitudinal rib, which protrudes outwardly, and said fastening tab is folded twice around said first rib, so that the ferrule is fastened to said bottom and said helical tube winding is axially stressed at its two ends between the bottom and the facade.

Thanks to these characteristics of the invention, the tie rods are eliminated, the overall number of parts is reduced and the cost is lower while preventing the helically wound tube from expanding axially since the attachment of the bottom and of the ferrule by double folding of the tabs is sufficient to prevent any deformation of the casing. In addition, the bottom and the ferrule are made of different materials that are better suited to the stresses to which they are subjected.

According to other advantageous and non-limiting characteristics of the invention, taken alone or in combination:

the bottom comprises an outer partition, a recess arranged in this outer partition, this recess protruding outwardly of the exchanger and opening out at the upper portion thereof into the gas discharge sleeve, and an inner partition joining the two sides of the outer partition located on either side of the mouth of the recess, this inner partition delimiting with the recess a gas discharge channel opening out into the gas discharge sleeve, the rear edge of said tubular ferrule has a plurality of cutouts delimiting either fastening tabs over its entire circumference, or fastening tabs over part of its circumference and at least one attachment tab over the remainder of its circumference, this inner partition is provided with at least one slot for receiving either an attachment tab or a fastening tab, and the fastening tab or the attachment tab which is inserted into this receiving slot is folded against said inner partition, to ensure the fastening of the ferrule with said bottom and the axial stress of said helically wound tube at one of its ends by the facade and at its other end by said outer partition and by said inner partition of the bottom;

the rear edge of said tubular metal ferrule is provided with a plurality of cutouts delimiting fastening tabs and with a plurality of cutouts delimiting at least one attachment tab and in that each receiving slot arranged in the inner partition, called attachment slot, is dimensioned such that an attachment tab can be inserted therein, this attachment tab being folded once against the face of the inner partition located opposite said gas discharge channel;

the recess arranged in the outer partition has a rear wall bordered by two side walls, the gas discharge sleeve comprises a cover intended to be added and fastened on the bottom, this cover comprises a return partition, this return partition delimiting with said inner partition and the two side walls said gas discharge channel opening out into the gas discharge sleeve, each receiving slot arranged in the inner partition, called fastening slot, is bordered longitudinally by a first longitudinal rib, the rear edge of said tubular metal ferrule is provided with fastening tabs over its entire periphery, and a fastening tab is inserted into each fastening slot and is folded twice around said first rib;

the bottom has a gas discharge channel which extends outwardly along the longitudinal axial direction of the exchanger, this gas discharge channel joining said gas discharge sleeve, the rear edge of said ferrule has said fastening tabs over its entire circumference and the bottom has over its entire circumference said fastening slots receiving said fastening tabs;

the first longitudinal rib has a square or rectangular cross-section and the fastening tab is folded twice at right angles around the protruding ridges of this first longitudinal rib;

an adhesive layer is disposed between the inner radial wall of the fastening slot, respectively of the attachment slot, and the surface of the fastening tab, respectively of the attachment tab, located oppositely and/or an adhesive layer is disposed between the outer radial wall of the fastening slot, respectively of the attachment slot, and the surface of the fastening tab, respectively of the attachment tab, located oppositely;

a second rib is formed on the bottom in the vicinity of said first rib in order to delimit a cavity therewith, the width and depth of said cavity, as well as the length of the fastening tab, are dimensioned so that the fastening tab is folded a third time outwardly of the exchanger and its free end bears against the face of the second rib located opposite the first rib;

a second rib is formed on the bottom in the vicinity of said first rib to delimit a cavity therewith and a resin layer is disposed in said cavity, so as to cover the end of the fastening tab;

said ferrule is formed of a sheet metal strip folded and/or curved on itself and whose both ends are assembled, preferably along a weld line;

said ferrule is made of stainless steel;

the reinforcement of said deflector is inserted between two adjacent turns of the tube and defines with said bottom, a condensation chamber;

the reinforcement of said deflector is inserted between the last turn, called "rear" turn of the helically wound tube and the bottom and several spacers are disposed between said bottom and said reinforcement, to arrange between this bottom and this reinforcement, a gas flow space connected to said gas discharge sleeve.

DESCRIPTION OF THE FIGURES

Other characteristics, aims and advantages of the invention will emerge from the following description, which is purely illustrative and not limiting, and which must be read in relation to the appended drawings in which.

DETAILED DESCRIPTION OF THE INVENTION

Figure 1:
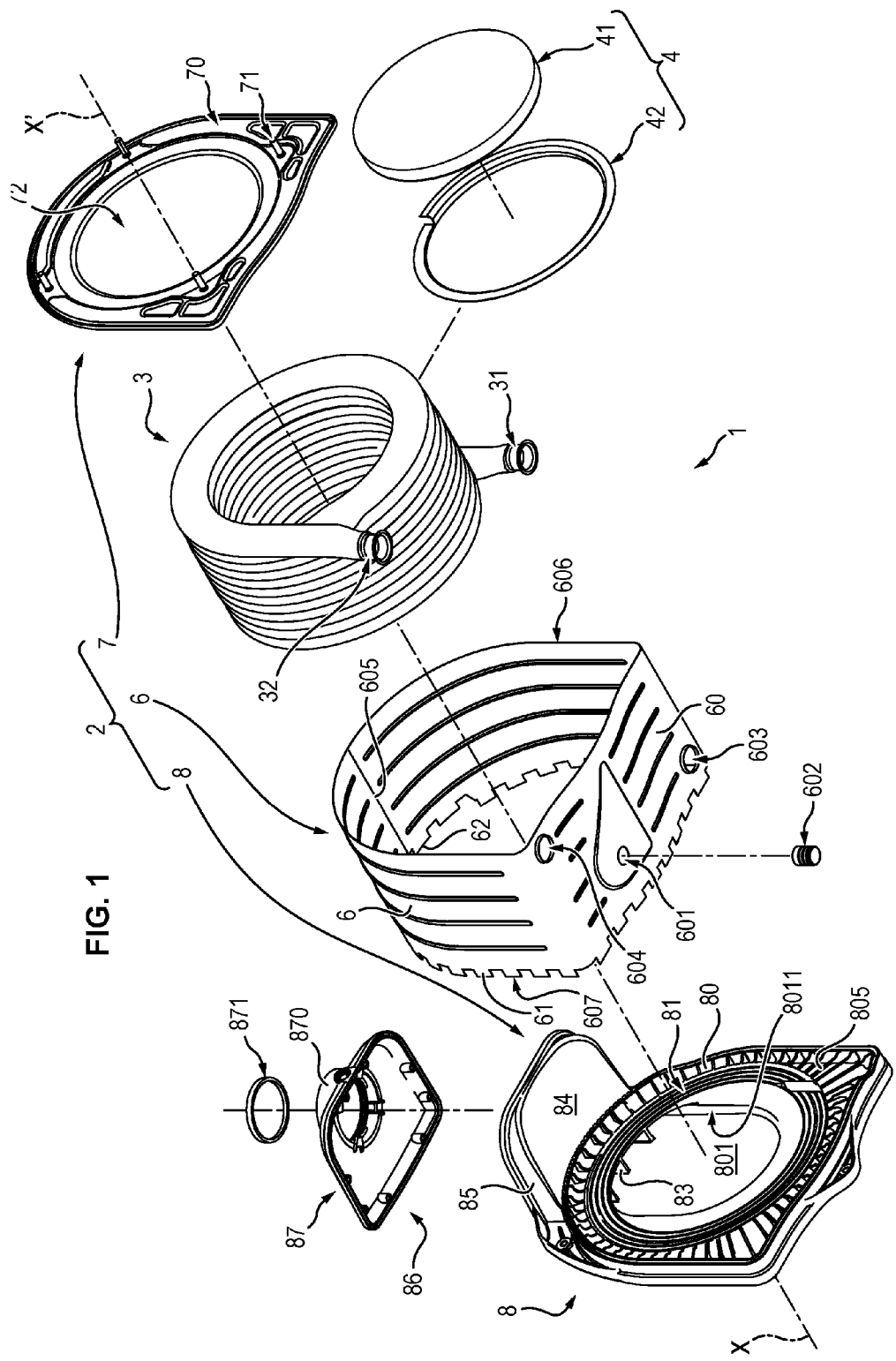
FIG. 1 is an overview of the different component parts of the heat exchanger in accordance with the invention, without the burner.
Figure 4:
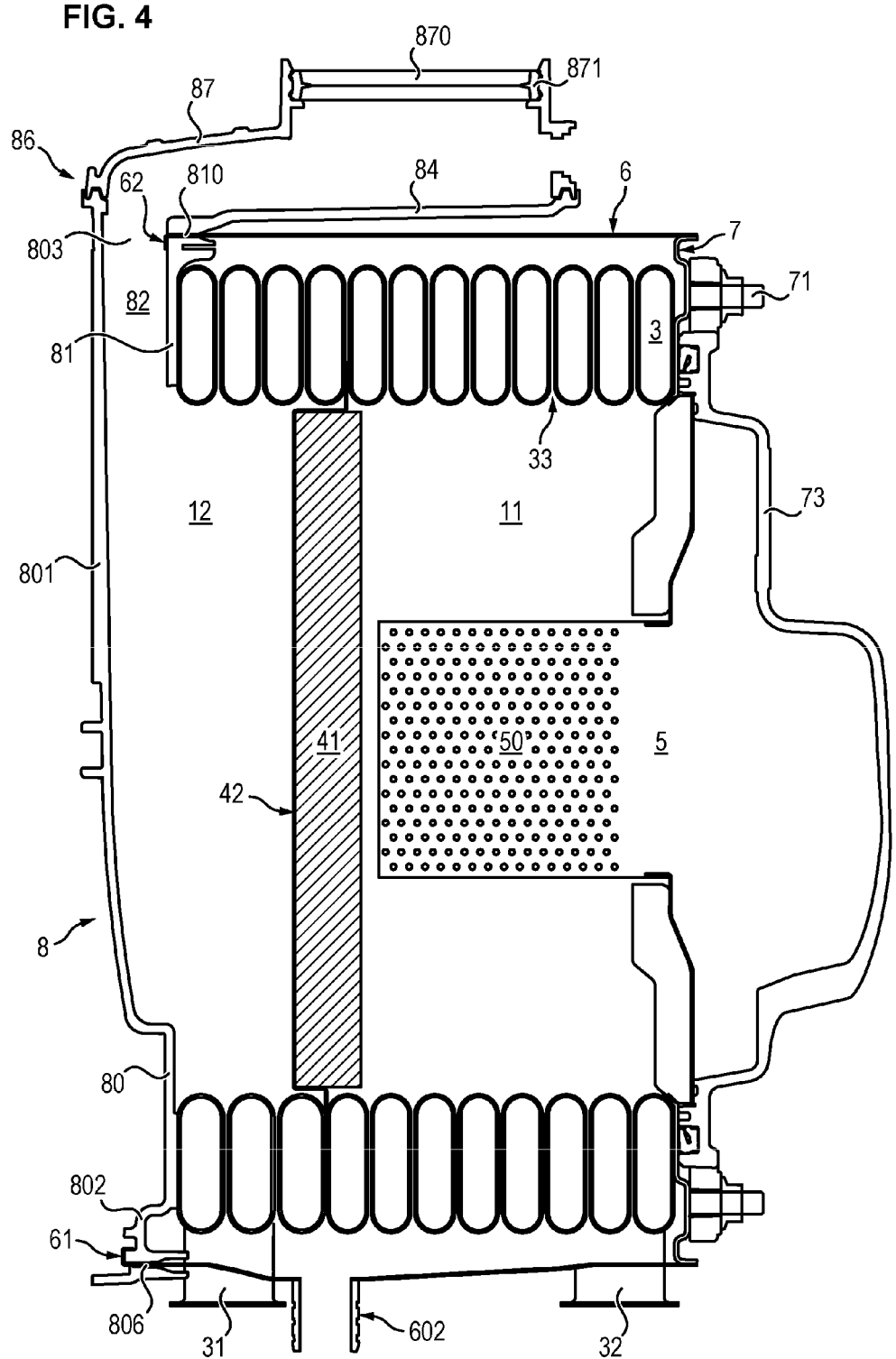
FIG. 4 is a cross-sectional view of the exchanger of FIG. 2, taken along the section plane passing through the line IV-IV of FIG. 2, and on which the burner has been added.
Figure 5:
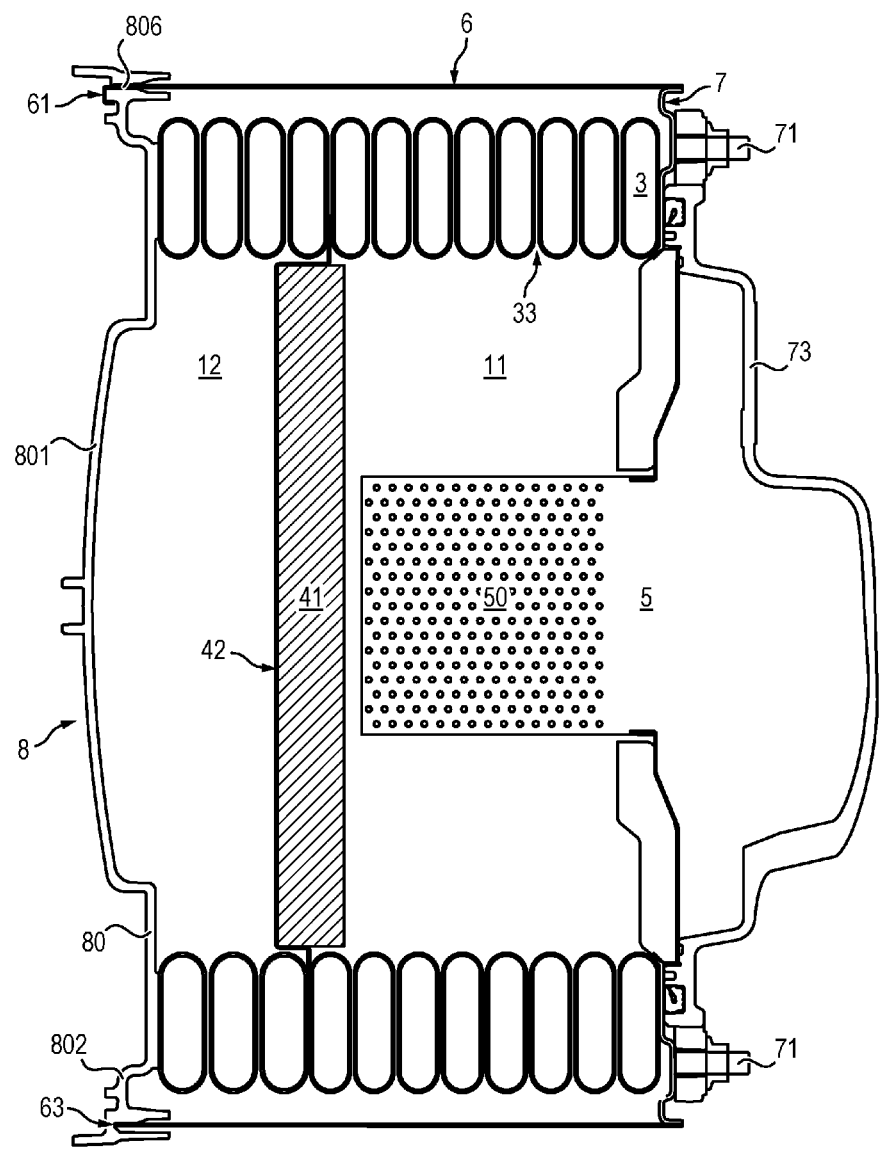
FIG. 5 is a cross-sectional view of the exchanger of FIG. 2, taken along the section plane passing through the line V-V of FIG. 2, on which the burner has been added.

Referring to the overall view of FIG. 1, it can be seen that the condensing heat exchanger 1, in accordance with the invention comprises a casing 2, at least one tube 3, a deflector 4, and means 5 for delivering hot gases or producing hot gases, the latter being visible only in FIGS. 4 and 5.

The casing 2 comprises a tubular ferrule 6 forming the body of the casing, a facade 7 and a bottom 8. The facade 7 supports said means 5 for delivering hot gases or producing hot gases, as will be described later. Furthermore, as can be seen in FIG. 1, the tubular ferrule 6 and the bottom 8 are separate before their assembly which will be described later.

FIGS. 1 to 4 represent the enclosure 1 in its normal use position. In the remainder of the description and claims, the terms "upper" or "lower" are therefore to be considered in relation to this normal use position.

The tube 3 is helically wound on itself, so as to form a helical winding, with a longitudinal axis XX'. The tube 3 has two ends forming an inlet mouth 31 and an outlet mouth 32.

It is made of a thermally conductive material, in particular of metal, advantageously of stainless steel. It is intended to receive a fluid to be heated, such as water.

As can be seen in FIGS. 4 and 5, there is an interstice 33 of constant or substantially constant calibrated value between two neighboring turns of the tube 3. Although in these figures the tube 3 has a flattened and oval cross section, note that it could present any other section.

The tube 3 is intended to be mounted inside the casing 2, whose components will now be described in more detail. Although this is not represented, it would also be possible to have several tubes 3 helically wound in the casing 2, these windings being coaxial.

The tubular ferrule 6 is advantageously made from a sheet metal strip, preferably stainless steel. Advantageously, this sheet is less than or equal to 1 mm thick.

This sheet metal strip advantageously has a central portion called "base wall" 60. This base wall 60 is slightly sloping towards its center, which allows the discharge of condensates by gravity, via an outlet orifice 601, connected to a discharge duct 602 of the condensates.

The base wall 60 is also provided with two openings 603, 604. When the tube 3 is mounted inside the ferrule 6, its inlet mouth 31 and its outlet mouth 32 are crimped and/or welded in a gas-tight manner, respectively in the aforementioned openings 603 and 604.

Advantageously, the two ends of the sheet metal strip, located on either side of the base wall 60, are folded substantially at right angles to the latter, then curved and their two free ends are welded along a weld line 605.

The tubular ferrule 6, thus formed, has a front edge 606 and an opposite rear edge 607.

The facade 7 has at its periphery a rim 70, which is fastened, preferably welded, in a gas-tight manner, on the front edge 606 of the annular ferrule 6.

The facade 7 is provided with several studs 71, here four in number, which protrude outwardly of the exchanger 1. The facade 7 comprises a central opening 72, able to be obturated by a door 73, the latter being visible only in FIGS. 4 and 5.

The door 73 is fastened on the facade 7 by means of studs 71. The door 73 supports in its central portion, a burner 50, for example a gas or oil burner, which constitutes an exemplary embodiment of a means for producing a hot gas 5. This burner could be replaced by means for delivering a hot gas (for example a fan), this hot gas having been produced outside the enclosure (casing).

The door 73 could also be fastened differently on the facade 7.

Figure 6:
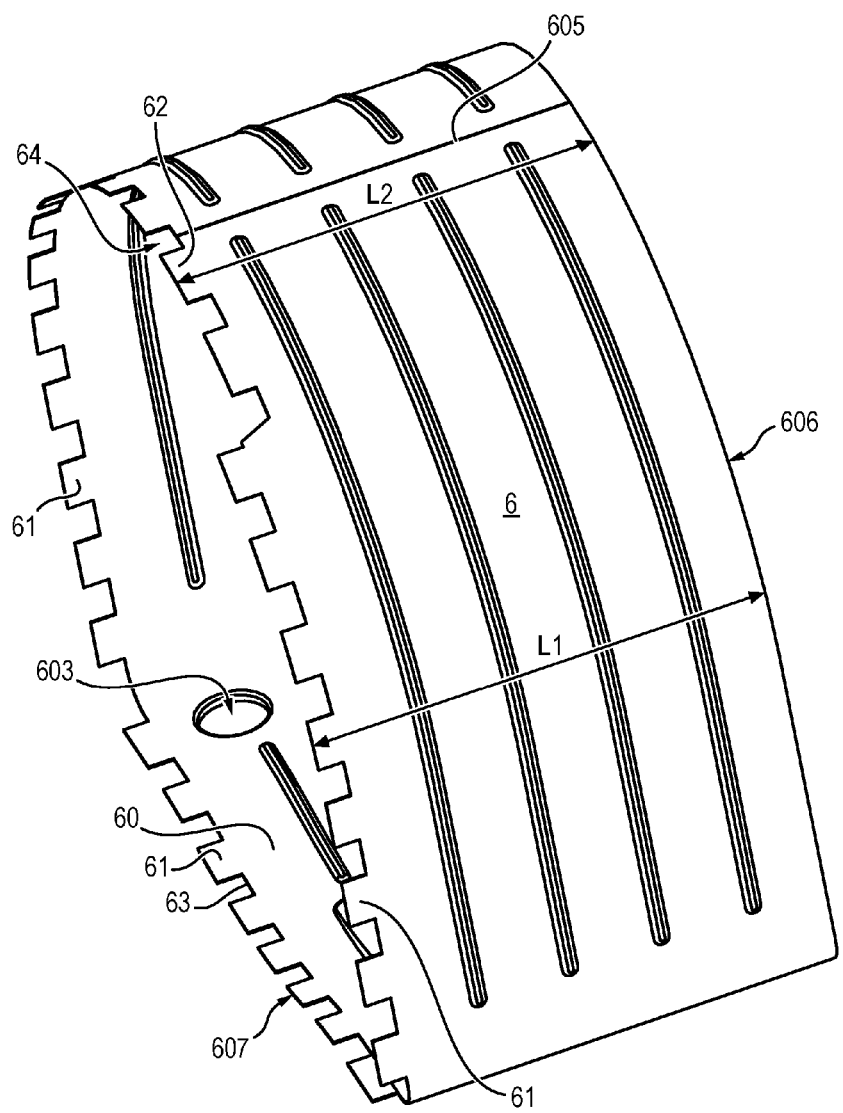
FIG. 6 is a perspective view of the casing.

As best seen in FIG. 6, which represents a first embodiment of the ferrule 6, the rear edge 607 has at its periphery a plurality of cutouts delimiting a first series of tabs, hereinafter referred to as "fastening tabs" 61 and at least one other tab hereinafter referred to as "attachment tab" 62, in order to distinguish their fastening mode on the bottom 8. The tabs 61 are separated from each other by cutouts (notches) 63 and the tabs 62 by cutouts (notches) 64.

The fastening tabs 61 are formed on almost the entire edge 607, except for the curved upper portion of this edge, that is to say in the exemplary embodiment represented in the figures, the portion located on either side of the weld line 605. It is in this curved upper portion of the edge 607 that the attachment tabs 62 are formed.

Advantageously, the cutouts are made such that the fastening tabs 61 and the attachment tabs 62 have a rectangular shape. Furthermore, preferably, the cutouts are made such that the attachment tabs 62 are set back from the fastening tabs 61. In other words, the length L1 between the front edge 606 and the free end of a fastening tab 61 is greater than the length L2 between the front edge 606 and the free end of an attachment tab 62. The role of this offset will be explained later.

The bottom 8 is made of composite plastic material. Such a plastic material comprises at least two different constituents. By way of illustrative example, this composite plastic material may be fiber-filled polypropylene, in particular filled with glass fibers.

Figure 7:
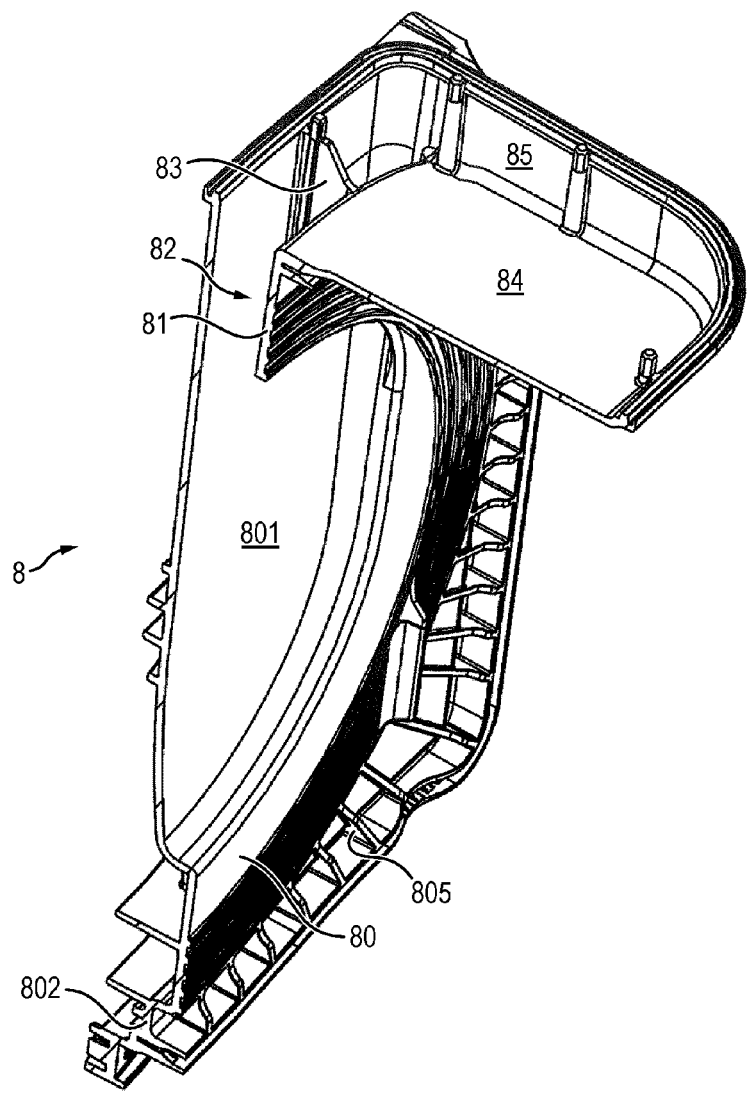
FIG. 7 is a perspective and top view of a portion of the bottom.

As best seen in the sectional views of FIGS. 4, 5 and 7, which illustrate a first embodiment of the bottom 8, this bottom 8 comprises a partition called "outer" partition 80 which is planar with the exception of a central area which forms a recess 801 protruding outwardly and of a peripheral area which forms a peripheral rim 802 also protruding outwardly.

The contour of the outer partition 80 substantially corresponds to that of the rear edge 607 of the ferrule 6. In other words, this contour has a substantially square shape, whose upper side is rounded.

The recess 801 has a U-shaped contour which opens out upwardly of the bottom 8. The recess 801 comprises a rear wall 8010 and two side walls 8011 which define the depth of the recess 801, see FIG. 3.

Furthermore, at the upper portion of the bottom 8, a partition portion, called "inner partition" 81, joins the two sides of the outer partition 80 located on either side of the mouth of the recess 801 and also the two side walls 8011 of the outer partition 80 located on either side of the mouth of the recess 801. It can be seen in FIG. 1 that this inner partition 81 has advantageously the shape of a circular arc to conform to the shape of the helical winding of the tube 3.

The inner partition 81 extends at a distance from the recess 801, as can be seen in FIGS. 4 and 7, and arranges with the latter a channel 82 for collecting and discharging gases. Spacers 83 may be provided between the inner partition 81 and the recess 801, as can be seen in FIGS. 1 and 7.

In addition, the inner partition 81 extends forwardly of the exchanger (that is to say towards the facade 7 and in an axial direction), by a curved wall 84 whose concavity conforms to the contour of the circular arc-shaped upper portion of the ferrule 6. A vertical rim 85 surrounds the curved wall 84 so as to define the lower portion of a gas discharge sleeve 86. Finally, a cover 87, which constitutes the upper portion of the gas discharge sleeve 86, caps the rim 85. This cover 87 is bonded in a gas-tight manner to this rim 85. The cover 87 is provided with an exhaust opening 870, preferably located in its upper portion. This opening 870, provided with a gasket 871 allows the connection to a gas exhaust pipe, not represented in the figures.

Figure 2:
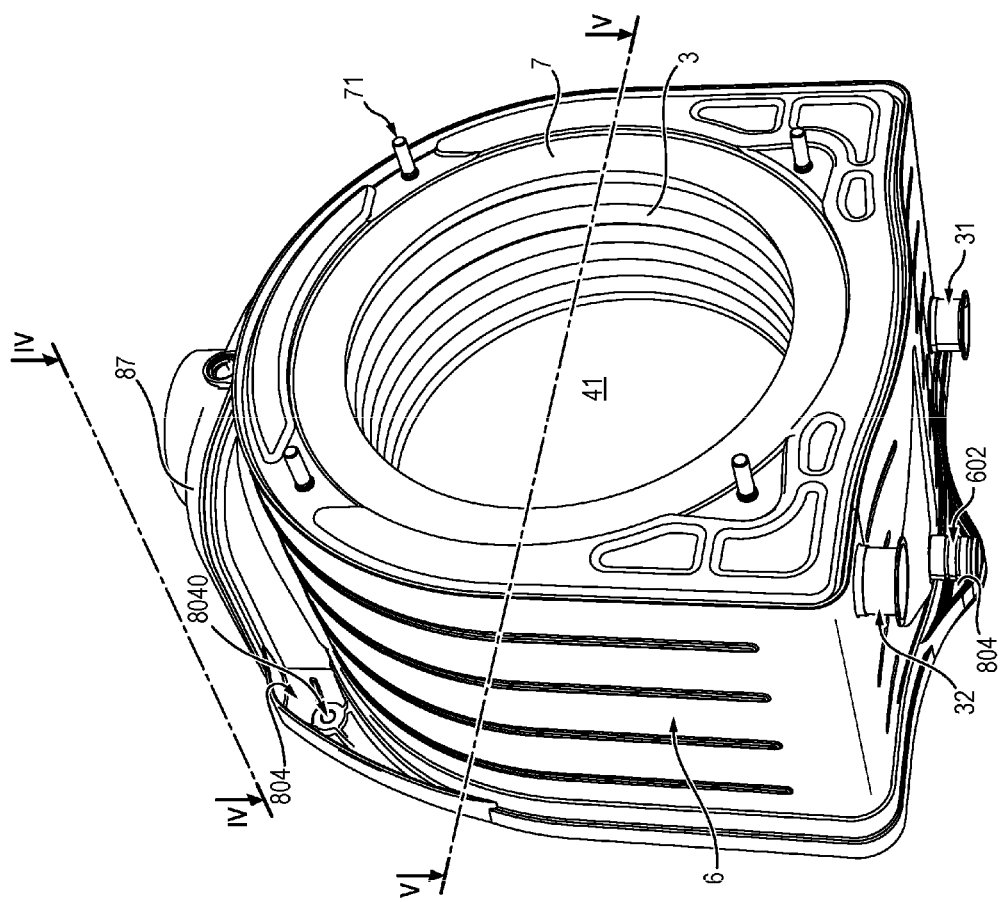
FIG. 2 is a perspective and front view of the parts of the exchanger of FIG. 1, once assembled.
Figure 3:
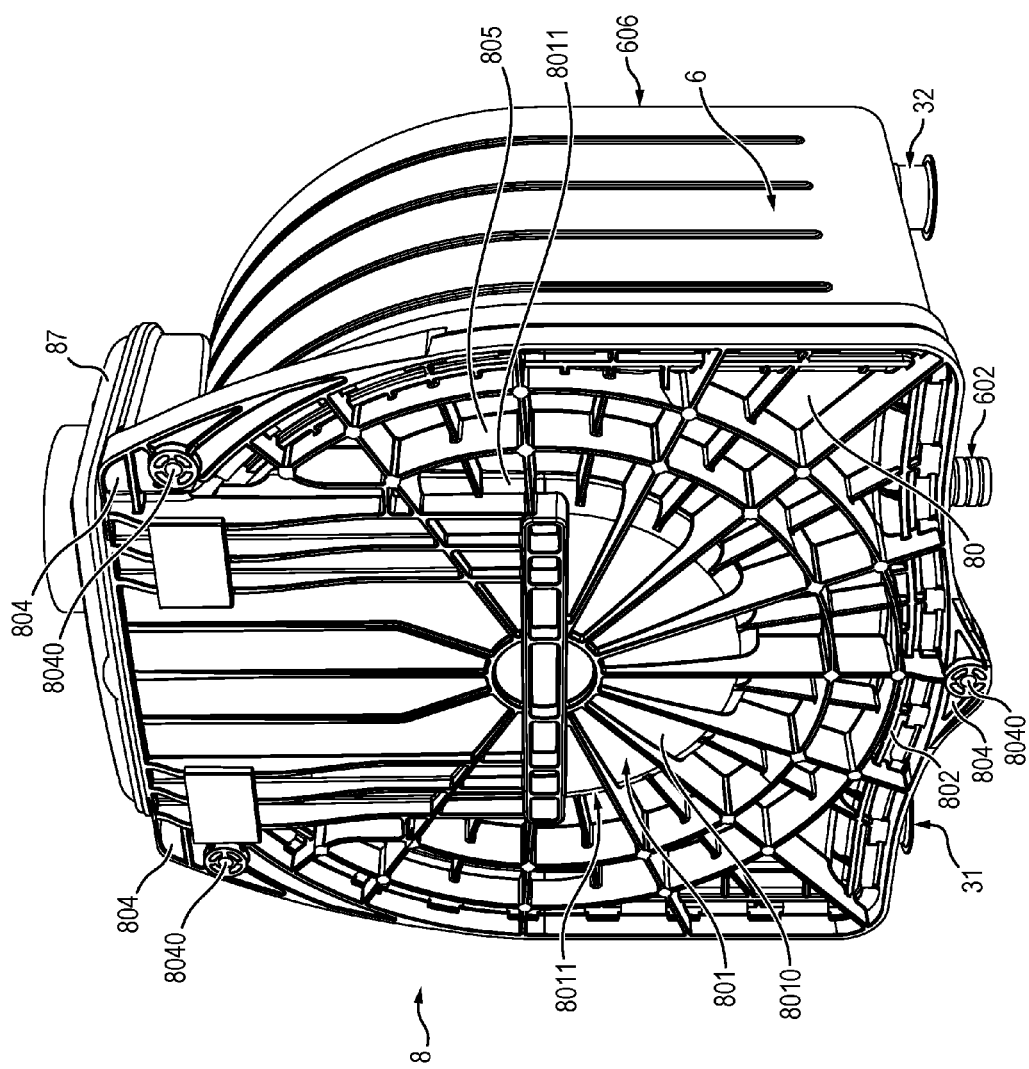
FIG. 3 is a perspective and rear view of the parts of the exchanger of FIG. 1, once assembled.

Advantageously, and as best seen in FIGS. 2 and 3, the outer partition 80 can be extended by lugs 804, here for example three in number, each provided with a fastening orifice 8040, the latter allowing the fastening of the bottom 8 on a partition of the boiler, not represented in the figures. These orifices 8040 allow for example the passage of fastening screws. Finally, advantageously, the external partition 80 can be provided on its external face and/or its lower face with stiffening ribs 805.

The fastening of the ferrule 6 on the bottom 8 will now be described in more detail.

The outer partition 80 is provided at its periphery with a series of slots 806, called "fastening slots", which are formed at the protruding rim 802. These slots 806 are disposed end to end in a circumferential manner on the bottom 8. These slots 806 extend all around the outer partition 80 with the exception of its upper portion where the recess 801 opens out. These fastening slots 806 are dimensioned to receive the fastening tabs 61, as best seen in FIGS. 8 to 14B.

Figure 9:
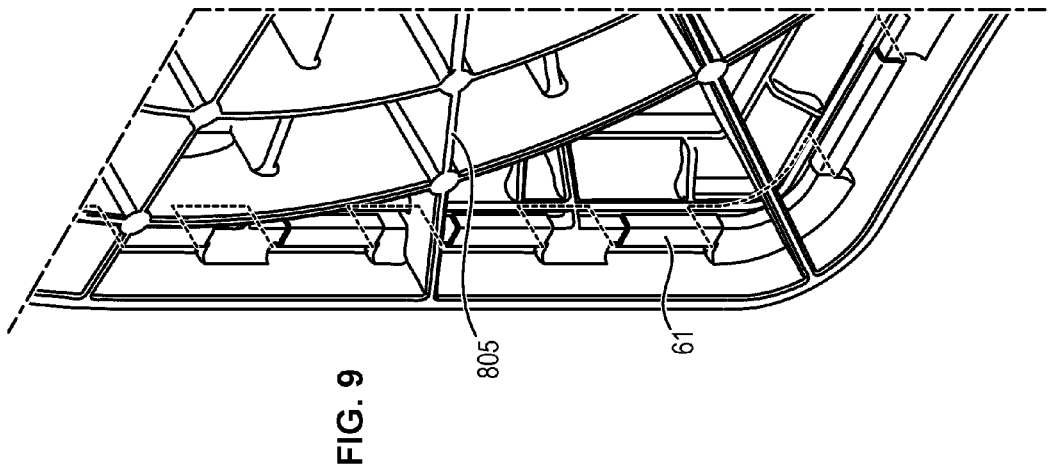
FIG. 9 is a view similar to that of FIG. 8, in which the fastening tabs engaged in the fastening slots have been folded twice on themselves, around a first fastening rib.
Figure 8:
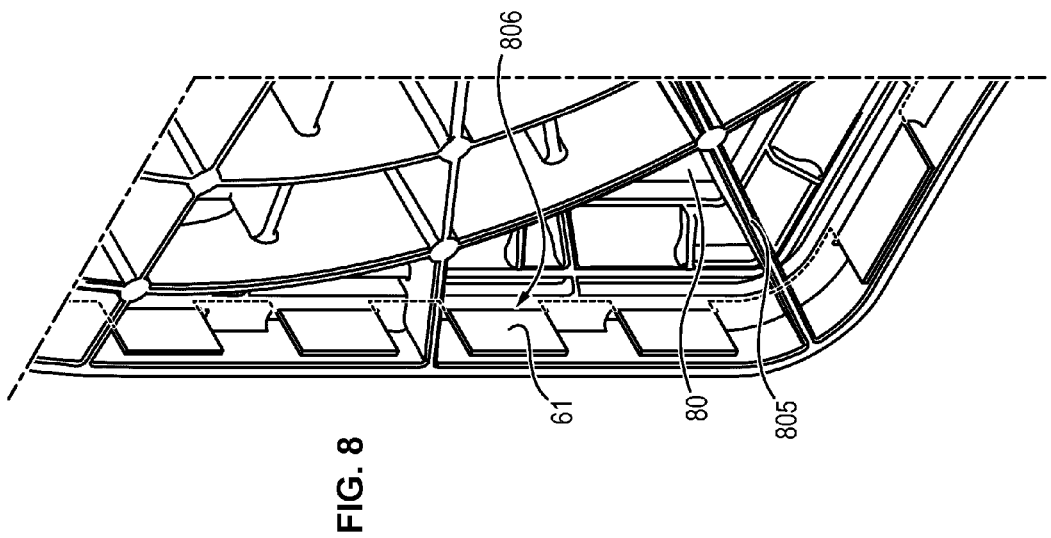
FIG. 8 is a perspective and rear view of a portion of the parts of the exchanger showing several fastening tabs of the ferrule engaged in the fastening slots of the bottom.
Figure 10:
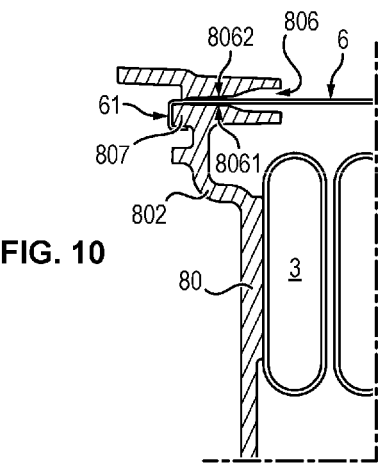
FIG. 10 is a cross-sectional and detailed view of a fastening tab of the ferrule, engaged in a fastening slot of the bottom and folded twice.

Referring to FIGS. 8 to 10, it can be seen how a fastening tab 61 is assembled in a fastening slot 806. Each fastening slot 806 comprises, along the radial direction of the exchanger, an internal wall 8061 and an external wall 8062 (see FIG. 10).

Each fastening slot 806 is bordered by a first longitudinal rib 807, which protrudes outwardly from the outer partition 80, more specifically from the rim 802 of the outer partition. This first rib 807 is preferably located in the vicinity of the internal radial wall 8061 of the slot.

Preferably, this first rib 807 has, in cross section, a square or rectangular shape.

As represented in FIG. 8, the fastening tab 61 is introduced into the fastening slot 806, then it is folded by a crimping operation, twice, around the first longitudinal rib 807.

As can be seen in FIGS. 8 and 9, the ferrule 6 is brought closer to the bottom 8, so that all the fastening tabs 61 penetrate into the respective fastening slots 806, located oppositely.

In the case where the first longitudinal rib 807 has a square or rectangular section, the fastening tab 61 is folded twice at right angles, namely a first time in the radial direction of the exchanger and a second time in the axial direction.

As can be seen in FIG. 4, when the fastening tabs 61 are crimped, the outer partition 80 rests against the last turn of the winding of the tube 3, located rearwardly of the exchanger and the facade 7 rests against the first turn of the winding of the tube 3, located forwardly of the exchanger.

This allows carrying out the axial compression of the tube 3.

Finally, as can be seen in the lower portion of FIG. 5, the bottom of the notch 63 comes into abutment against the inner face of the protruding rim 802.

Figure 11:
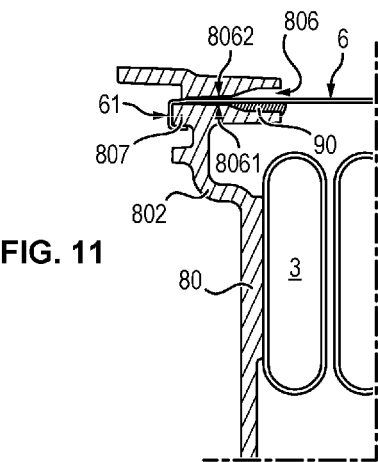
FIG. 11 is a view similar to FIG. 10, in which adhesive has been added between the tab and the slot arranged in the bottom.

FIG. 11 represents one variant, in which an adhesive layer 90 has been applied on the internal face of the fastening tab 61, before its introduction inside the fastening slot 806, so that this adhesive layer 90 is distributed between the tab 61 and the radially internal wall 8061 of the slot 806 and thus reinforces the fastening of the fastening tab 61 and therefore of the ferrule 6 on the bottom 8. It will be noted that it would also be possible to provide for an adhesive layer 90 between the tab 61 and the radially external wall 8062 of the slot, although this is not represented in FIG. 11.

This adhesive layer 90 reinforces the gas tightness of the casing 2. A silicone adhesive can for example be used.

Figure 12A:
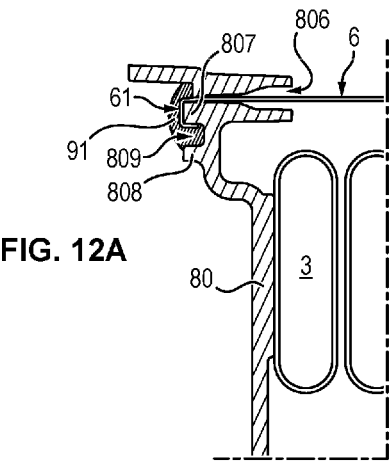
FIG. 12A is a view similar to FIG. 10, in which adhesive has been added on the curved portion of the tab, on the external side of the bottom.
Figure 12B:
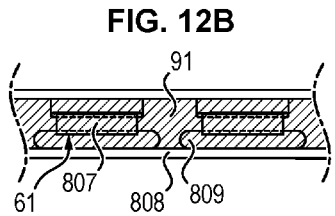
FIG. 12B represents two tabs and two slots of FIG. 12A but in top view.

FIGS. 12A and 12B represent another variant, in which a resin layer 91 has been applied on the end of the fastening tab 61, on the side of the external face of the partition 80. In order to promote the retention of this resin layer 91, advantageously, a second longitudinal rib 808 is arranged, opposite the first longitudinal rib 807, so as to delimit therewith a cavity 809 where the resin 91 can accumulate.

This resin 91 has the function of reinforcing the fastening of the fastening tab 61 around the first rib 807 and of preventing this tab from unfolding.

Note that it is also possible to combine the addition of adhesive 90 and resin 91.

Figure 13A:
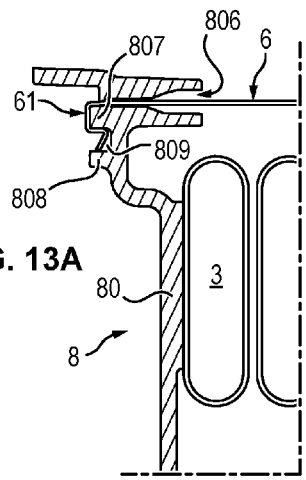
FIG. 13A is a variation of FIG. 10, in which the fastening tab has been folded three times.
Figure 13B:
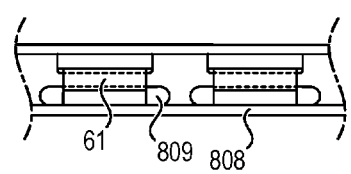
FIG. 13B represents two tabs and two slots of FIG. 13A but in top view.

FIGS. 13A and 13B represent one variant, in which the fastening tab 61 is slightly longer than previously, so as to be able to be folded a third time, outwardly of the exchanger. In this case, the end of the fastening tab is folded into a V inside the cavity 809, and the two branches of the V, which tend to be spaced apart from each other due to their elasticity, have the effect of reinforcing the blocking of the tab 61 in the cavity 809 and of preventing this tab from coming out of the fastening slot 806, in the case where the pressure prevailing inside the tube 3 tends to space apart the turns of the tube in the axial direction.

Although this is not represented in FIGS. 13A and 13B, it is also possible to provide for an adhesive layer 90 between the fastening tab 61 and either of the walls 8061, 8062 of the slot 806 and/or to add a resin layer 91 in the cavity 809, thus covering the end of the tab 61, as previously described in relation to FIGS. 11 to 12B.

Figure 14A:
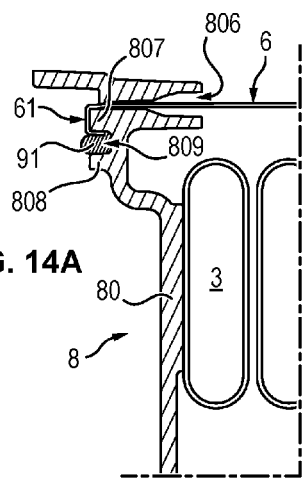
FIG. 14A is a view similar to FIG. 10, in which adhesive has been added between the first fastening rib and a second fastening rib, on the external side of the bottom.
Figure 14B:
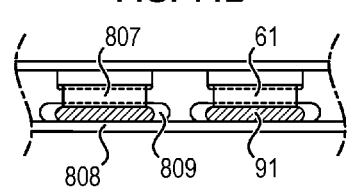
FIG. 14B represents two tabs and two slots of FIG. 14A but in top view.

FIGS. 14A and 14B represent another variant simplified with respect to that of FIGS. 12A and 12B, in which the resin layer 91 is applied only inside the cavity 809 and therefore only on the end of the tab 61.

Figure 15:
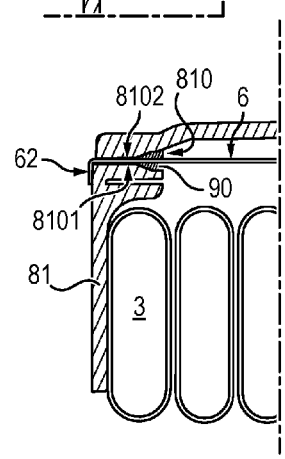
FIG. 15 is a cross-sectional and detailed view of an attachment tab of the ferrule, engaged in an attachment slot of the bottom and folded once.

FIG. 15 represents how an attachment tab 62 is assembled with a slot called "attachment" slot 810, arranged in the inner partition 81. There are as many attachment slots 810 as tabs 62. In this case, the end of the attachment tab 62 is folded only once, in the radial direction of the exchanger, so as to be pressed against the face of the inner partition 81 located opposite the gas discharge channel 82, preferably in the radially inner direction.

Advantageously, an adhesive layer 90 can also be deposited between the attachment tab 62 and the internal radial wall 8101 of the slot 810 and/or between the attachment tab 62 and the external radial wall 8102 of the slot 810.

In practice, during the manufacturing method, the cover 87 of the gas discharge sleeve is not fastened, as long as the operation of crimping the attachment tabs 62 has not been carried out. The absence of this cover indeed allows the introduction of the crimping tool in the channel 82 opposite the tab 62, as can be understood from examining FIG. 4.

At this location, the turns of the tube 3 are axially stressed between the facade 7 and the inner partition 81.

Furthermore, and as mentioned above, the attachment tabs 62 are set back from the fastening tabs 61. Indeed, as can be seen in FIG. 4, as the last rear turn of the winding of the tube 3 ends at the inlet mouth 31 and as the latter passes through the opening 603 arranged in the ferrule 6, the fastening tab 61 is advantageously crimped on the protruding rim 802 of the bottom 8, (that is to say in an area which is not directly in alignment with the outer wall 80 but which is slightly offset outwardly, that is to say towards the left in FIG. 4), so as to retain enough material of the ferrule 6 between the opening 603 and the fastening tab 61 and not to weaken the ferrule at this location. On the other hand, the attachment tabs 62 are fastened on the inner partition 81 which is set back from the rim 802.

Figure 18:
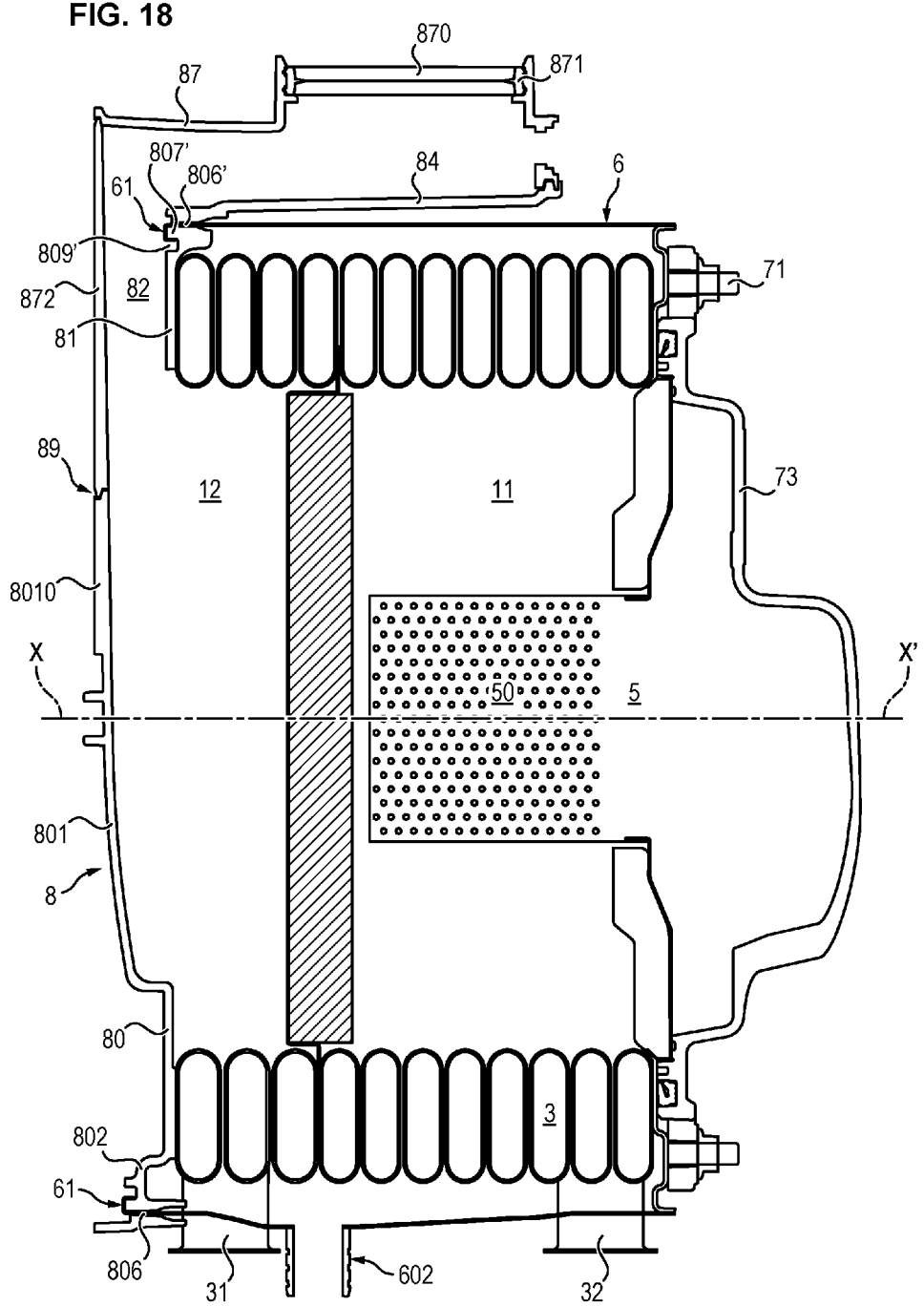
FIG. 18 is a cross-sectional view of another embodiment of the exchanger.

FIG. 18 represents another variant of the invention, in which the gas discharge sleeve 86 and the recess 801 are shaped differently, which allows having a ferrule 6 which has fastening tabs 61 over its entire periphery.

More specifically, in this case, the rear wall 8010 of the recess 801 does not extend to the top of the bottom 8 and the cover 87 comprises on the other hand a return partition 872 which extends in the direction of the recess 801 and opposite the inner partition 81 to delimit therewith the gas discharge channel 82. The junction line between the return partition 872 and the top of the recess 801 is referenced 89. At its two ends, the inner partition 81 is secured to the side walls 8011.

The inner partition 81 then comprises at least one fastening slot 806', bordered longitudinally respectively by a first rib 807' (as described previously) and a cavity 809'. Each fastening tab 61 is folded twice around the rib 807'.

When crimping the fastening tabs 61, since the cover 87 is not present and the inner partition 81 more accessible, it is possible to fold the fastening tabs 61 twice. A resin layer 91 can also be deposited on said tab 61.

Figure 19:
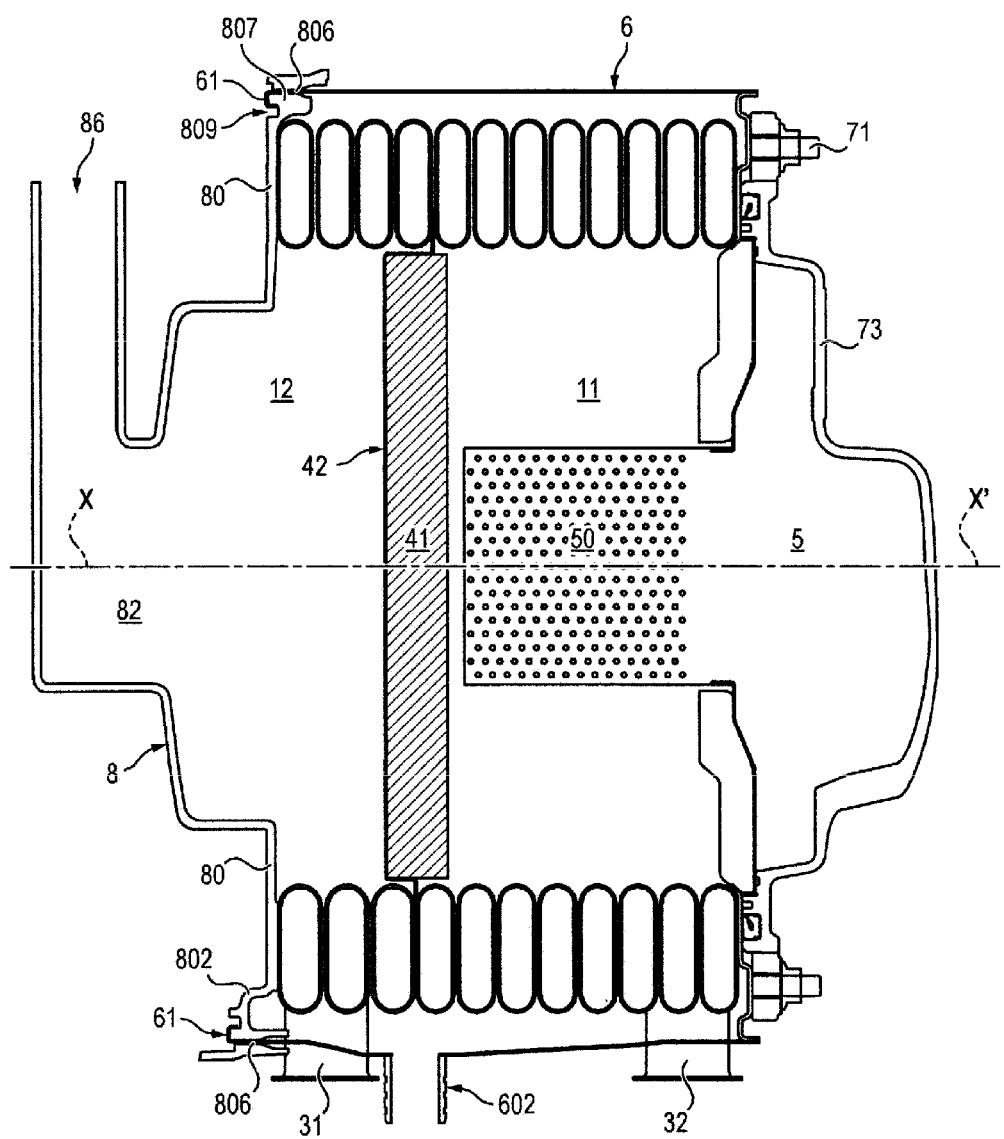
FIG. 19 is a sectional view of another variant of the exchanger.

It is easily understood that the bottom 8 and the gas discharge sleeve could have other shapes and that depending on the position of the gas discharge channel 82 relative to the bottom 8, the fastening slots 806 previously described can be provided on part of the circumference of the bottom 8 or on this entire circumference. This latter possibility could apply for example if the gas discharge channel 82 extended from the bottom 8, outwardly and along the longitudinal axis XX' of the exchanger (see FIG. 19) before joining the gas discharge sleeve 86. The last rear turn of the winding of the tube 3 rests against the outer partition 80 and the axial compression is ensured.

Tests have been performed in order to measure the tensile strength exerted on the ferrule 6, in the event where the tube 3 were to deform axially and push on the bottom 8.

Figure 16:
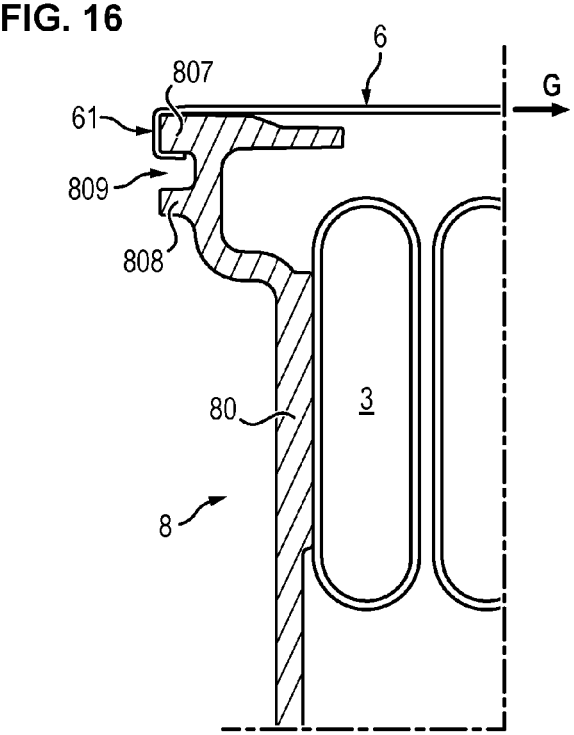
FIG. 16 is a diagram representing a tensile force applied to the ferrule, in the case where the fastening tab would not be retained in a slot.
Figure 17:
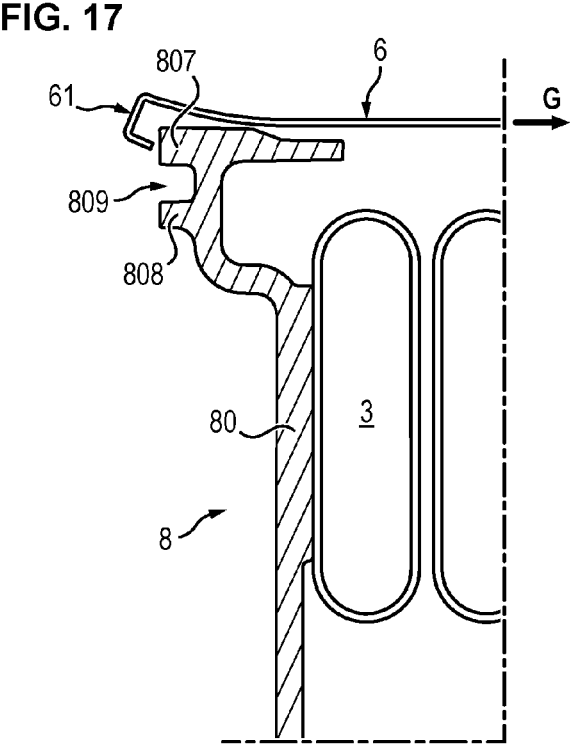
FIG. 17 is a diagram representing the result of the traction applied to the ferrule, in the case of FIG. 16.

FIGS. 16 and 17 schematize the situation that would be observed, if the fastening tab 61 were simply crimped around the longitudinal rib 807 and did not pass through a fastening slot 806. In this case, it is noted that if the a traction is exerted on the casing 6, in the axial direction and along the direction of the arrow G, and if this traction exceeds a certain threshold, the tab 61 then tends to deform and unfold, so that it no longer plays its role of fastening between the casing 6 and the bottom 8.

The tests have thus shown that a fastening tab 61 could withstand a tensile strength of 65 kg, before deforming, in the case represented in FIG. 16, where the tab 61 is not engaged in a slot.

In the case where the fastening tab 61 is engaged in a fastening slot, as represented in FIG. 10, the tests showed that this tab could withstand a tensile strength of 110 kg, before deforming. Finally, the tests carried out with a fastening tab folded three times, as represented in FIG. 13A, showed that this tab could withstand a tensile strength of 140 kg.

The deflector 4 comprises a disk 41 made of thermally insulating material, carried by a reinforcement made of thin sheet metal 42.

This deflector 4 can be positioned in two different ways relative to the tube 3 so as to always form at least one combustion chamber 11.

According to a first embodiment illustrated in FIG. 4, the deflector 4 is inserted into the tube 3, so that the peripheral edge of the reinforcement 42 is inserted between two adjacent turns of the tube 3. This deflector 4 thus defines a combustion chamber 11, arranged between this deflector and the facade 7 and a condensation chamber 12, arranged between this deflector and the bottom 8.

Figure 20:
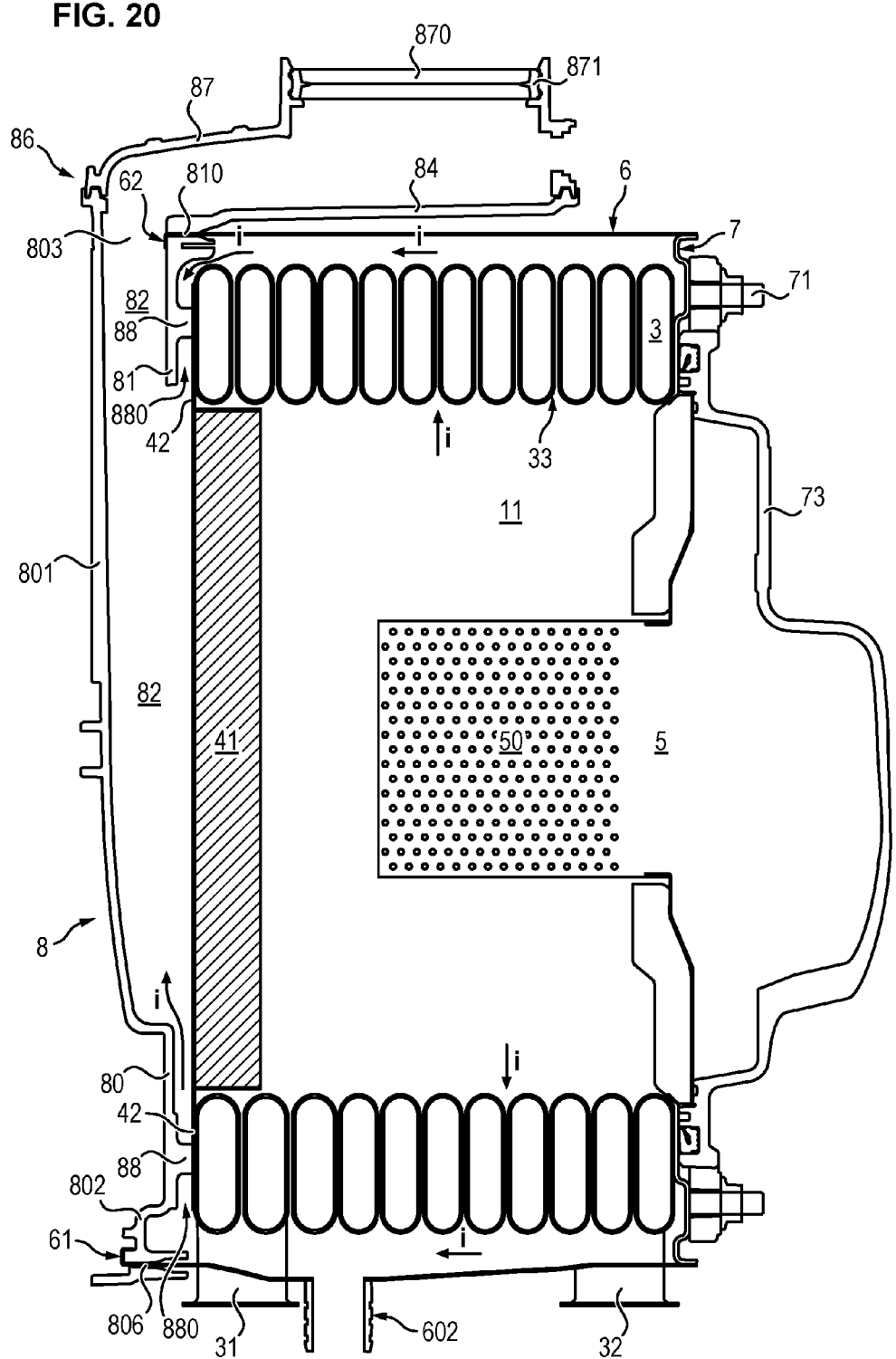
FIG. 20 is a sectional view showing another disposition of the deflector.

According to a second embodiment illustrated in FIG. 20, the deflector 4 is positioned between the bottom 8 and the last turn called "rear" turn of the winding of the tube 3 (that is to say the turn located in the vicinity of the bottom 8). In this case, the deflector 4 only defines a combustion chamber 11 which extends between this deflector and the facade 7. In this case, a plurality of spacers 88 are disposed between the bottom 8 and said reinforcement 42 to arrange, between these two elements, a gas flow space 880, connected to said gas discharge sleeve 86, via the gas discharge channel 82.

Advantageously, the spacers 88 are arranged on the face oriented forwardly (towards the facade 7) of the outer partition 80 and of the inner partition 81.

The assembly of the different elements of the exchanger 1 can be performed for example as follows.

The tube 3, provided with the deflector 4 is inserted into the ferrule 6, before or after the strip constituting it has been closed and the weld 605 has been made. The mouths 31 and 32 are crimped and/or welded in a gas-tight manner in the orifices 603 and 604.

The facade 7 is welded on the front edge 606 of the casing 6. The casing 6 is brought closer to the bottom 8, so that the fastening tabs 61 enter the fastening slots 806 and the attachment tabs 62 (when they are present) enter the attachment slots 810.

The crimping of the different tabs 61, 62 is performed as explained previously.

Finally, the cover 87 of the gas discharge sleeve 86 is fastened on the rim 85 of the bottom 8.

The operation of the condensing heat exchanger 1 thus obtained will be briefly recalled below.

Inside the combustion chamber 11, the hot gases produced by the burner 50 pass through the interstices 33 existing between the adjacent turns of the tube 3, from inside to outside, hit the ferrule 6, continue in the condensation chamber 12, again pass through the interstices 33 existing between the adjacent turns of the tube 3, this time from outside to inside and are then discharged via the discharge channel 82 and the gas discharge sleeve 86.

In the embodiment represented in FIG. 20, the hot gases produced by the burner 50 pass through the interstices 33 existing between the adjacent turns of the tube 3, from inside to outside, hit the ferrule 6, pass through the gas flow space

880 and are then discharged via the discharge channel 82 and the gas discharge sleeve 86 (see arrows i).

Furthermore, the fluid to be heated flows from the inlet mouth 31 to the outlet mouth 32 that is to say in countercurrent to the hot gases.

The exchanger in accordance with the invention therefore has many advantages. The total number of parts is reduced compared to an exchanger of the state of the art, the tie rods are eliminated while axially stressing the winding of the tube 3. The mounting is simplified.

In addition, the bottom 8 is compact, integrates the gas discharge sleeve and therefore ensures a function of enclosure bottom, of gas discharge and participates in the axial stress of the winding of the tube 3.

Finally, the bottom 8 is not temperature-loaded due to the presence of the deflector 4. It is made of a composite plastic material, advantageously chosen so as to resist the mechanical stresses that the bottom 8 undergoes in the event of spacing of the turns of the tube 3 in the axial direction. This material allows avoiding any risk of electrolysis with the material of the ferrule 6. The entire exchanger is therefore less expensive than the exchangers of the state of the art while guaranteeing the axial stress of the winding of the tube 3 thanks to the innovative fastening mode of the ferrule 6 and of the bottom 8.

The invention claimed is:

1. A condensing heat exchanger comprising:
   at least one helically wound tube made of a thermally conductive material and inside which a fluid to be heated; can flow,
   a casing inside which the at least one helically wound tube is mounted, —the casing being provided with a gas discharge sleeve, a bottom and a facade, which supports means configured for delivering and/or producing a hot gas inside the casing,
   a deflector which comprises a disk made of thermally insulating material, carried by a sheet metal reinforcement, the deflector being positioned relative to the helically wound tube so as to delimit, with the facade, a combustion chamber,
   wherein the casing comprises a body consisting of a tubular metal ferrule, the tubular metal ferrule having two ends and being closed at one of the two ends by the facade and at the other of the two ends by the bottom,
   wherein the tubular ferrule and the bottom are separate before assembly,
   wherein the bottom is formed in a composite plastic material,
   wherein the tubular metal ferrule has a rear edge which has on at least a part of the circumference of the tubular metal ferrule, a plurality of cutouts delimiting fastening tabs,
   wherein the bottom has at the periphery of the bottom a plurality of fastening slots disposed along at least part of the circumference of the bottom, each fastening slot being dimensioned so as a fastening tab can be inserted therein, each fastening slot being bordered longitudinally by a first longitudinal rib, which protrudes outwardly, and wherein the fastening tab has two folded regions around the first longitudinal rib, so that the ferrule is fastened to the bottom and the helically wound tube is axially stressed at two ends of the helically wound tube between the bottom and the façade.

2. The exchanger according to claim 1, wherein the bottom comprises:
   an outer partition,
   a recess arranged in the outer partition, the recess protruding outwardly of the exchanger and opening out at the upper portion of the exchanger into the gas discharge sleeve,
   and an inner partition joining two sides of the outer partition located on either side of a mouth of the recess, the inner partition delimiting with the recess a gas discharge channel opening out into the gas discharge sleeve,
   wherein the rear edge of the tubular metal ferrule has a plurality of cutouts delimiting either fastening tabs over the entire circumference of the rear edge, or fastening tabs over part of the circumference of the rear edge and at least one attachment tab over the remainder of the circumference of the rear edge,
   wherein this inner partition is provided with at least one attachment slot for receiving an attachment tab or one fastening slot for receiving a fastening tab,
   and wherein the fastening tab which is inserted into the fastening slot or the attachment tab which is inserted into the attachment slot has at least one folded region against the inner partition, to ensure the fastening of the ferrule with the bottom and the axial stress of the helically wound tube at one of the ends of the helically wound tube by the facade and at the other end of the helically wound tube by the outer partition and by the inner partition of the bottom.

3. The exchanger according to claim 2, wherein the rear edge of the tubular metal ferrule is provided with the plurality of cutouts delimiting the fastening tabs and with the plurality of cutouts delimiting the at least one attachment tab and wherein each attachment slot arranged in the inner partition is dimensioned such that the attachment tab can be inserted in the attachment slot, the attachment tab having one folded region against a face of the inner partition located opposite the gas discharge channel.

4. The exchanger according to claim 2, wherein the recess arranged in the outer partition has a rear wall bordered by two side walls,
   wherein the gas discharge sleeve comprises a cover intended to be added and fastened on the bottom, —wherein the cover comprises a return partition, the return partition delimiting with the inner partition and the two side walls the gas discharge channel opening out into the gas discharge sleeve,
   wherein each fastening slot arranged in the inner partition is bordered longitudinally by a first longitudinal rib,
   wherein the rear edge of the tubular metal ferrule is provided with fastening tabs over its entire periphery,
   and—wherein one fastening tab is inserted into each fastening slot and has two folded regions around the first longitudinal rib of the fastening slot arranged in the inner partition.

5. The exchanger according to claim 1, wherein the bottom has a gas discharge channel which extends outwardly along a longitudinal axial direction of the exchanger, the gas discharge channel joining the gas discharge sleeve, wherein the rear edge of the ferrule has the fastening tabs over the entire circumference of the rear edge and wherein the bottom has over the entire circumference of the bottom the fastening slots receiving the fastening tabs.

6. The exchanger according to claim 1, wherein the first longitudinal rib has a square or rectangular cross-section and wherein the fastening tab has two folded regions at right angles around protruding ridges of the first longitudinal rib.

7. The exchanger according to claim 1, wherein an adhesive layer is disposed between an inner radial wall of the fastening slot, respectively of the attachment slot, and a surface of the fastening tab, respectively of the attachment tab, located oppositely and/or wherein an adhesive layer is disposed between an outer radial wall of the fastening slot, respectively of the attachment slot, and the surface of the fastening tab, respectively of the attachment tab, located oppositely.

8. The exchanger according to claim 1, wherein a second rib is formed on the bottom in the vicinity of the first longitudinal rib in order to delimit a cavity therewith, wherein the width and depth of the cavity, as well as a length of the fastening tab, are dimensioned so that the fastening tab has a third folded region which is folded outwardly of the exchanger and the free end of the fastening tab bears against a face of the second rib located opposite the first longitudinal rib.

9. The exchanger according to claim 1, wherein a second rib is formed on the bottom in the vicinity of the first longitudinal rib to delimit a cavity therewith and wherein a resin layer is disposed in the cavity, so as to cover the end of the fastening tab.

10. The exchanger according to claim 1, wherein the ferrule is formed of a sheet metal strip folded and/or curved on itself and both ends of the ferrule are assembled, preferably along a weld line.

11. The exchanger according to claim 1, wherein the ferrule is made of stainless steel.

12. The exchanger according to claim 1, wherein the reinforcement of the deflector is inserted between two adjacent turns of the helically wound tube and defines with the bottom, a condensation chamber.

13. The exchanger according to claim 1, wherein the reinforcement of the deflector is inserted between the last rear turn of the helically wound tube and the bottom and wherein several spacers are disposed between the bottom and the reinforcement, to arrange between the bottom and the reinforcement, a gas flow space connected to the gas discharge sleeve.

14. The exchanger according to claim 1, wherein the means configured for delivering and/or producing a hot gas inside the casing are a gas burner or an oil burner.

* * * * *